(12) United States Patent
Bai et al.

(10) Patent No.: US 11,702,522 B2
(45) Date of Patent: Jul. 18, 2023

(54) POLYMER-BASED SPHERICAL POWDER PREPARATION DEVICE AND PREPARATION PROCESS

(71) Applicant: Sichuan University, Chengdu (CN)

(72) Inventors: Shibing Bai, Chengdu (CN); Shiping Song, Chengdu (CN); Yijun Li, Chengdu (CN); Ning Chen, Chengdu (CN)

(73) Assignee: Sichuan University, Chengdu (CN)

( * ) Notice: Subject to any disclaimer, the term of this patent is extended or adjusted under 35 U.S.C. 154(b) by 245 days.

(21) Appl. No.: 17/301,887

(22) Filed: Apr. 17, 2021

(65) Prior Publication Data

US 2022/0332911 A1     Oct. 20, 2022

(51) Int. Cl.
   *C08J 3/12*    (2006.01)
   *C08J 7/12*    (2006.01)

(52) U.S. Cl.
   CPC .............. *C08J 7/123* (2013.01); *C08J 3/12* (2013.01); *C08J 2371/08* (2013.01); *C08J 2377/02* (2013.01)

(58) Field of Classification Search
   CPC .................. B02C 7/08; B29B 2009/166
   See application file for complete search history.

(56) References Cited

U.S. PATENT DOCUMENTS 4,783,214 A * 11/1988 Kemp, Jr. ............... B22F 1/065
                                                  75/252

FOREIGN PATENT DOCUMENTS

| CN | 106216695 | * 12/2016 |
| CN | 110193893 | *  9/2019 |

OTHER PUBLICATIONS

Translation of CN 110193893 (Year: 2019).*
Translation of CN 106216695 (Year: 2016).*

* cited by examiner

*Primary Examiner* — Robert C Boyle
(74) *Attorney, Agent, or Firm* — George Guosheng Wang; Upstream Research and Patent LLC

(57) ABSTRACT

A polymer-based spherical powder preparation device and preparation process are disclosed. The preparation device comprises a mill milling system and an inductively coupled plasma powder spheroidization system. The mill milling system of the preparation device can achieve ultra-fine grinding of the material at room temperature by applying strong extrusion, shear and circumferential stress to the material; and the inductively coupled plasma powder spheroidization system using high temperature plasma as high temperature heat source, the polymer powder can be heated uniformly, and the melting and cooling rate is fast, so the spheroidization can be completed in a short time. The preparation process of polymer based spherical powder was integrated and continuously produced by the preparation device.

10 Claims, 2 Drawing Sheets

POLYMER-BASED SPHERICAL POWDER PREPARATION DEVICE AND PREPARATION PROCESS

BACKGROUND

Technical Field

The present invention belongs to the field of polymer materials, and specifically relates to a polymer-based spherical powder preparation device and preparation method, especially preparation of raw materials suitable for a selective laser sintering technology.

Related Art

As an important 3D printing technology, a selective laser sintering (SLS) technology is an advanced manufacturing method which has been developed rapidly in recent years based on a discrete/stacking principle. According to the SLS technology, powder materials are selectively melted under heat action of lasers and stacked layer by layer on the basis of a CAD model to form a final part. Compared with traditional processing methods, SLS processing mainly has the technical advantages of free forming and overall manufacturing, thus can be used to produce parts with arbitrarily complex structures. Therefore, customized production of complex parts is achieved.

Raw materials for SLS processing are powder materials, mainly including metal materials, ceramic materials and polymer materials. Compared with other materials, polymer materials have the advantages of low density, low costs and easy modification, processing and post-treatment, and can meet individual needs under different application conditions. Therefore, the polymer materials are the most widely used SLS materials. Based on a unique processing process, the SLS technology has high performance requirements for polymer materials. Under such requirements, warping and deformation of SLS parts can be effectively prevented through a wide sintering window, and proper particle size distribution and high bonding strength are the key to obtaining good parts. In addition, high flowability and bulk density of polymer powder materials are also the guarantee for obtaining SLS parts with high density, high mechanical strength and high dimensional precision.

Polymer materials have an important position in selective laser sintering materials and broad application prospects. So deep researches on application of polymer powder materials in selective laser sintering have been conducted by scholars at home and abroad. Particle shapes of polymer powder materials have a significant effect on performance of parts and are related to preparation methods. At present, processing and preparation methods of polymer powder for selective laser sintering mainly include a cryogenic pulverization method, a solvent precipitation method, a spray drying method and the like. These methods have different advantages, and can prepare SLS polymer powder materials with certain particle size distribution and regular shapes. But these methods also have certain defects: the cryogenic pulverization method has simple operation, but poor powder mixing effect and powder form. Powder prepared by using the solvent precipitation method is uniform in size and mixing, but the operation is complicated, and the production efficiency is low. The spray drying method is high in consumption of organic solvents, which may pollute the environment.

SUMMARY

In order to solve the defects or problems in the related art, the present invention provides a polymer-based spherical powder preparation device and preparation method. With the preparation device, integrated and continuous production of a polymer-based spherical powder in a preparation method is achieved, and the preparation method is greatly improved, so that a polymer-based spherical powder material with excellent performance and applicable to the SLS field is prepared, and can be produced in a large scale at the same time.

In order to achieve the objectives above, the present invention is implemented by adopting a technical solution comprising the following technical features.

A polymer-based spherical powder preparation device includes a mill milling system and an inductively coupled plasma powder spheroidization system.

The mill milling system includes a feeding member, a mill cavity cover, a fixed mill, a rotating mill, a rotating bearing, a transmission device, a motor and a liquid medium temperature adjustment system. The fixed mill and the rotating mill are fixed in the mill cavity cover, the rotating mill is fixedly connected to the rotating bearing, and the transmission device is driven by the motor to drive the rotating bearing to rotate, thereby driving the rotating mill to rotate. The fixed mill and the rotating mill are also provided with the liquid medium temperature adjustment system, the liquid medium temperature adjustment system realizes temperature adjustment of the fixed mill and the rotating mill by introducing a liquid medium into the fixed mill and the rotating mill, and the entire mill milling system is of a closed type.

The inductively coupled plasma powder spheroidization system includes an inductively coupled plasma generator, a cooling and shaping chamber, a collection chamber, a gas supply device, a high-frequency power supply and a vacuum pumping device, and the inductively coupled plasma generator, the cooling and shaping chamber and the collection chamber are communicated with one another.

The inductively coupled plasma generator includes a feeding pipe, a reaction gas pipe, a protective gas pipe, an induction coil, a molten material spray head and a generator housing, the reaction gas pipe is arranged in the protective gas pipe, one end of the feeding pipe is closely connected to a discharging end of the mill milling system, the other end of the feeding pipe penetrates through the reaction gas pipe and extends into the protective gas pipe, the induction coil is arranged around an outside of the protective gas pipe, and the reaction gas pipe does not extend into a surrounding setting surface of the induction coil. The molten material spray head is arranged at a tip of the end, close to the induction coil, of the protective gas pipe. The reaction gas pipe, the protective gas pipe, the induction coil and the molten material spray head are all closely fixed in the generator housing, and the inductively coupled plasma generator is communicated with the cooling and shaping chamber through the molten material spray head.

The cooling and shaping chamber includes a plurality of high-pressure gas spray heads and a cooling and shaping chamber housing, the high-pressure gas spraying heads are arranged around a cross section of the cooling and shaping chamber housing at equal distances, nozzles of the high-pressure gas spraying heads all face the same position in the cooling and shaping chamber housing, and the position is located on a central axis of a nozzle of the molten material spray head.

The collection chamber includes a condensed water inlet pipe, a slurry outlet and a collection chamber housing, and the collection chamber housing is communicated with the cooling and shaping chamber housing.

The gas supply device includes a reaction gas inlet pipe with one end communicated with the reaction gas pipe and a protective gas inlet pipe with one end communicated with the protective gas pipe, and the other ends of the reaction gas inlet pipe and the protective gas inlet pipe are communicated with the reaction gas pipe and the protective gas pipe respectively.

The vacuum pumping device is communicated with an inside of the cooling and shaping chamber housing.

Further, The high-frequency power supply is electrically connected to the induction coil, and a high-frequency power supply with an output frequency of 3±0.5 MHz is used.

Further, the mill milling system also includes a hydraulic machine, the fixed mill and the rotating mill are fixedly connected to the hydraulic machine, and the milling surface spacing or pressure between the fixed mill and the rotating mill is adjusted by using the hydraulic machine.

Further, the liquid medium temperature adjustment system is liquid medium channels separately arranged in the fixed mill and the rotating mill and a corresponding liquid medium circulation device. Preferably, the rotating bearing is separately provided with a liquid medium inlet and a liquid medium outlet, and the liquid medium inlet and the liquid medium outlet are communicated with the liquid medium channel in the rotating mill.

Usually, the discharging end, closely connected to one end of the feeding pipe, of the mill milling system is determined by a discharging port according to different types of milling surfaces of the used fixed mill and the rotating mill. For example, when the same fixed mill and rotating mill in the prior patent "Solid Phase Power Chemical Reactor" (China Patent No. ZL95111258.9, Publication No. CN1130545A) of the applicant are used, the discharging end is arranged around edges of the two mills. A closed groove surrounding the mills can be designed by those skilled in the art according to the discharging end above to collect milled materials, and transfer the materials into the feeding pipe. The design of the discharging end structure above is conventional knowledge in the field of milling processing or prior art.

Preferably, the feeding pipe is also covered with a condensed water sleeve. Usually, the condensed water sleeve is communicated with a condensed water circulation system to exchange condensed water. Further preferably, the feeding pipe is also provided with a temperature measuring device.

Preferably, a central axis of the reaction gas pipe overlaps with a central axis of the protective gas pipe, and one ends of the reaction gas pipe and the protective gas pipe are flush and fixed in the generator housing. The reaction gas pipe is a straight pipe with a length of 50-80 mm and a nozzle diameter of 30-40 mm, and the protective gas pipe is a straight pipe with a length of 300-400 mm and a nozzle diameter of 50-60 mm.

Preferably, in order to improve the melting effect of the inductively coupled plasma generator on the polymer-based powder, a diameter of the feeding pipe is 10-15 mm, the other end of the feeding pipe penetrates through the reaction gas pipe and extends into the protective gas pipe, and the nozzle of the feeding pipe extending into the protective gas pipe is 20-50 mm away from the reaction gas pipe, so that the polymer-based powder directly enters a target area of a plasma torch through the feeding pipe, and a temperature field of the target area is 100-500° C.

Preferably, in order to increase the flow rate of the molten materials in the plasma torch, shorten the residence time of the materials in the plasma torch and prevent polymers from decomposing and carbonizing due to long residence time, a diameter of the protective gas pipe is reduced from 50-60 mm to 10-15 mm which is the same as a nozzle diameter of the molten material spray head, and a flow rate of the materials is increased by reducing a width of a flow channel. The nozzle of the molten material spray head overlaps with a central axis of the protective gas pipe, the molten material spray head forms a convex structure toward the outside of the protective gas pipe, and the nozzle is 10-30 mm away from the protective gas pipe.

A plurality of the high-pressure gas spray heads are arranged around a cross section of the cooling and shaping chamber housing at equal distances, nozzles of the high-pressure gas spraying heads all face the same position in the cooling and shaping chamber housing, the pressure of introduced gas is maintained the same when the high-pressure gas spraying heads are used, so as to quickly cool the polymer-based powder after plasma melting, prevent the polymer-based powder from degrading and oxidizing in a high-temperature melting state and make physical and chemical properties of the polymer-based powder remain unchanged. At the same time, the pressure of gas introduced into the high-pressure gas spray heads which are arranged around the cross section of the cooling and shaping chamber housing at equal distances is maintained the same, a low-temperature cooling area is formed at a lower end of the molten material spray head, and a flow direction of carrier gas discharged from the molten material spray head is not changed by the high-pressure gas spray heads which are arranged at equal distances, so that the polymer-based powder is cooled and shaped without collision, the prepared polymer-based powder has no agglomeration phenomenon, and surfaces of particles are smooth. Preferably, there are 8 high-pressure gas spray heads, the cross section of the cooling and shaping chamber housing is circular, the 8 high-pressure gas spray heads are arranged around the circular cross section of the cooling and shaping chamber housing at equal distances, and the nozzles all face a circular center of the circular cross section.

The vacuum pumping device is communicated with an inside of the cooling and shaping chamber housing, the inductively coupled plasma generator, the cooling and shaping chamber and the collection chamber are communicated with one another, one end of the feeding pipe in the inductively coupled plasma generator is closely connected to the discharging end of the mill milling system, and condensed water is introduced into the collection chamber and floods the slurry outlet. Therefore, the inductively coupled plasma generator, the cooling and shaping chamber and the collection chamber which are communicated with one another constitute a closed system. When the vacuum pumping device communicated with the inside of the cooling and shaping chamber housing is in operation, a negative pressure environment is formed inside the closed system, and therefore, no additional power source or operation is needed for transporting the materials in the feeding pipe.

Preferably, the generator housing, the cooling and shaping chamber housing and the collection chamber housing are connected to one another and integrally formed, a double-layer water-cooled stainless steel structure is adopted, and a cooling water inlet and outlet is formed in an outside surface.

Generally speaking, in addition to the structural features and technical parameters defined by the present invention, an inductively coupled plasma powder spheroidization device in the ceramic field can be taken as a reference for other technical features and implementation methods of the inductively coupled plasma powder spheroidization system, such as the prior patent "A Device and Method for Generating Inductively Coupled Thermal Plasma under Low Pressure" (CN201510385291.5).

It is worth noting that although the inductively coupled plasma powder spheroidization system is widely used in the ceramic field, ceramics have a melting point much higher than that of polymer-based powders and other characteristics, and an inductive plasma torch is a temperature field with dozens to tens of thousands of Celsius degrees, the melting point of ceramics is often thousands of Celsius degrees, and the spheroidization treatment temperature is thousands to tens of thousands of Celsius degrees. The melting point of polymers is mostly 100-400° C., the decomposition temperature is mostly 200-500° C., and the spheroidization treatment temperature is higher than the melting point and lower than the decomposition temperature. Therefore, the technical solution of the present invention is developed and designed by the inventor of the present invention according to different characteristics of the above materials.

A preparation method for preparing polymer-based spherical powder by using the preparation device includes the following steps:

(1) milling: putting polymer-based particles into the preparation device through a feeding member, and setting process parameters for the mill milling system as follows: a milling pressure is 10-15 MPa, a rotating speed of a rotating mill is 20-50 r/min, and a temperature of cooling water is 0-20° C.;

(2) spheroidization: introducing reaction gas and protective gas through a reaction gas inlet pipe and a protective gas inlet pipe respectively, introducing high-pressure gas into a high-pressure gas spray head for spraying, and setting process parameters for a inductively coupled plasma powder spheroidization system as follows: a reaction gas flow rate is 1-1.5 m$^3$/h, a protective gas flow rate is 1-1.5 m$^3$/h, a voltage of a high-frequency power supply is 6000-7000 V, an anode current is 5-10 A, a frequency is 3±0.5 MHz, a flow rate of molten materials at a nozzle is maintained at 3-5 V/s, and a gas pressure in a cooling and shaping chamber is maintained at 0.02-0.08 MPa;

(3) collection: introducing condensed water through a condensed water inlet formed in a collection chamber, and collecting a slurry product flowing out of the slurry outlet;

(4) post-treatment: filtering, drying and sieving the collected slurry product to obtain a polymer-based spherical powder.

The polymer-based material is usually a thermoplastic polymer-based material which can be used for 3D printing. In order to better illustrate the present invention, the polymer-based material is preferably nylon, polyvinylidene fluoride, polyether-ether-ketone, polystyrene or polyurethane, or a composite material with the preferred polymer-based material above as a main component.

Preferably, in the spheroidization step, a temperature in the feeding pipe is controlled to be 40-70° C. The temperature can be controlled by combining condensed water circulation and temperature measurement.

The reaction gas is preferably argon, and the protective gas is preferably argon or nitrogen.

The high-pressure gas is preferably inert gas argon, and an introduced gas pressure is 1-2 MPa.

The present invention provides a continuous production device including a milling system, a spheroidization system and a collection system. In a preferred technical solution, according to different physical properties of materials, the pressure between the mills can be adjusted by using a hydraulic machine to achieve the best milling effect. Since a negative pressure environment is formed inside the apparatus, the materials are driven by airflow to enter the milling system conveniently and quickly without manual addition. With the design and improvement above, the production efficiency of the apparatus is greatly improved, the output can reach 10-15 kg/h, continuous and batch production of all thermoplastic polymer spherical powder is realized, and there is no need to adjust process parameters according to polymer types. According to the production device, inert gas is used as a dispersion medium, and no dispersant is needed, so that the production process is environmentally friendly and clean. The powder only has physical changes in a spheroidization process, so that chemical properties of the obtained spherical powder are the same as those of original polymers, and the product property is stable.

The polymer-based spherical powder prepared according to the technical solution of the present invention has a sphericity of 97% or above, a smooth particle surface with no wrinkles and burrs, an average particle size of 90-100 μm, narrow and normal particle size distribution, and a half-peak width of 100-110 μm. In the prepared polymer-based spherical powder, a sintering window of PA11 spherical powder is 15° C., a sintering window of PVDF spherical powder is 18° C., the powder flowability is high, and a stacking angle is 23-27°.

The technical route of the present invention is mature, stable and reliable, and the polymer-based spherical powder preparation device having a powder preparation function and a powder spheroidization function is designed and manufactured and has the following beneficial effects:

(1) The preparation device uses polymer-based particles as raw materials and polymer-based spherical powder as a target product, and the prepared polymer-based spherical powder has high sphericity, high flowability and narrow particle size distribution and is applicable to the SLS field, so the preparation device becomes a new way for continuous, large-scale and mass preparation of high-performance polymer-based spherical powder.

(2) The preparation device realizes ultra-fine pulverization of polymer particles by using the mill milling system with the mills as a main body, and then performs spheroidization treatment of the milled powder by using a temperature field generated by inductive plasma. There are complete facilities for a preparation system, no solvent is involved in the entire production process, and no pollutant is discharged, so that the preparation method is safe, environmentally friendly, clean and reliable.

(3) The preparation device has a wide application range and high adjustment ability, and the milling surface spacing, the air flow rate, the voltage size, the feeding pipe position and other process conditions can be changed according to types and properties of the materials to produce any type of thermoplastic polymers or spherical powder of composite materials.

(4) The mill milling system of the preparation device realizes ultra-fine pulverization of materials at room temperature by applying a strong extrusion, shearing and hoop stress to the materials. The inductively coupled plasma powder spheroidization system uses high-temperature plasma as a high-temperature heat source, so that polymer powder is heated uniformly, the melting and cooling rates are high, and spheroidization treatment can be completed in a very short time. The entire preparation method has the advantages of high production efficiency, low costs and short production cycle.

In the figures, 1 feeding hopper, 2 hydraulic machine, 3 fixed mill cavity cover, 4 fixed mill water inlet, 5 fixed mill water outlet, 6 fixed mill, 7 rotating mill, 8 rotating mill cavity cover, 9 rotating bearing, 10 transmission chain, 11 motor, 12 rotating mill water inlet, 13 rotating mill water outlet, 14 feeding pipe, 15 reaction gas inlet pipe, 16 protective gas inlet pipe, 17 reaction gas pipe, 18 protective gas pipe, 19 high-frequency power supply, 20 induction coil, 21 collection chamber, 22 condensed water inlet pipe, 23 slurry outlet, 24 vacuum pumping device, 25 inductively coupled plasma generator, 26 cooling and shaping chamber, 27 high-pressure gas spray head, and 28 molten material spray head.

DETAILED DESCRIPTION

The present invention is further described below by using the embodiments and the accompanying drawings. It is worth noting that the given embodiments should not be considered as limitations to the protection scope of the present invention. Some non-essential improvements and adjustments made to the present invention by those skilled in the art based on the content of the present invention should still fall into the protection scope of the present invention.

Embodiment 1

Figure 1:
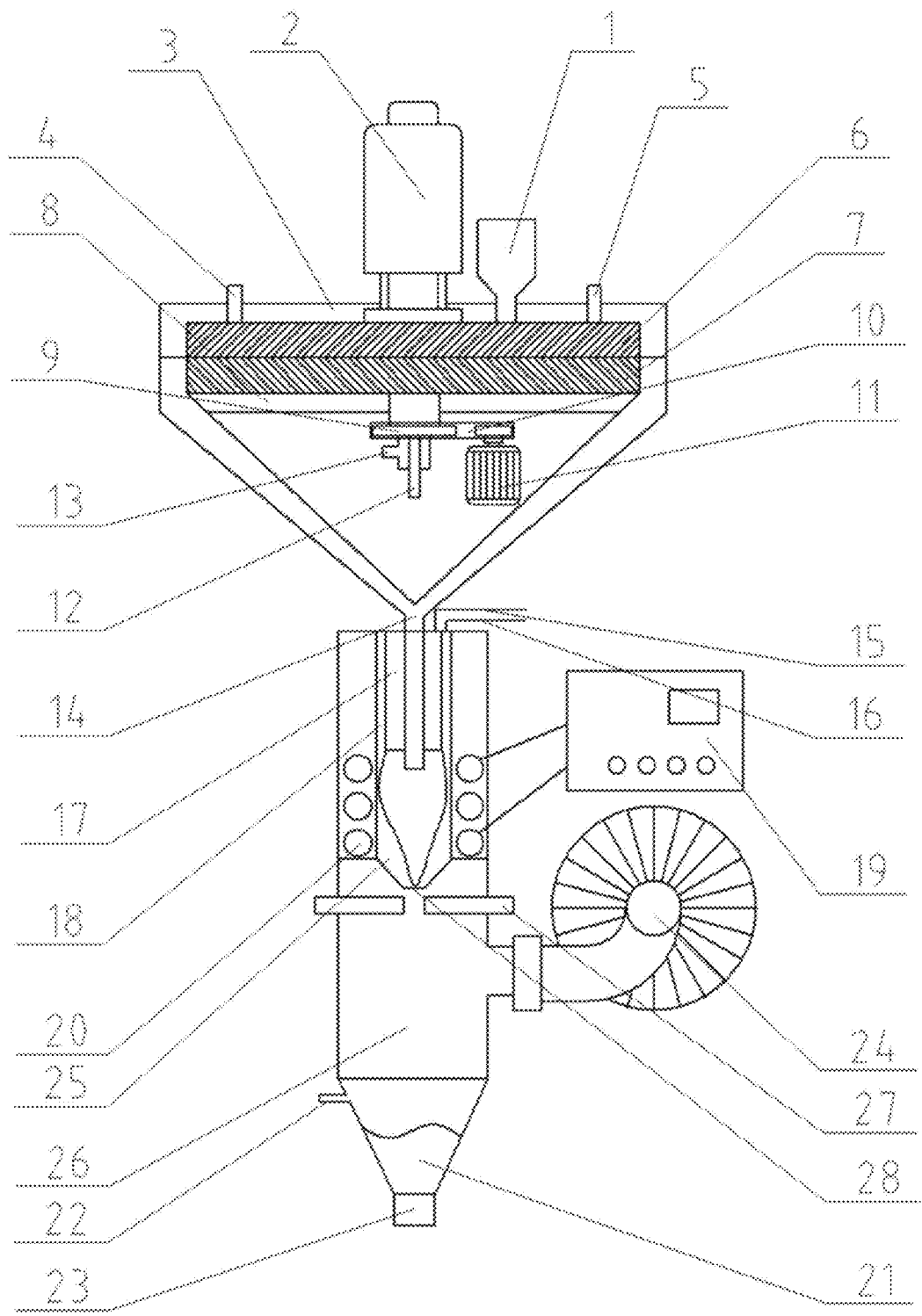
FIG. 1 is a schematic structural diagram of a polymer-based spherical powder preparation device in Embodiments 1-3 of the present invention.

As shown in FIG. 1, a polymer-based spherical powder preparation device includes a mill milling system and an inductively coupled plasma powder spheroidization system.

The mill milling system includes a feeding hopper 1, a mill cavity cover comprising a fixed mill cavity cover 3 and a rotating mill cavity cover 8, a fixed mill 6, a rotating mill 7, a rotating bearing 9, a transmission device comprising a transmission chain 10, a motor 11 and a liquid medium temperature adjustment system. The fixed mill 6 and the rotating mill 7 are fixed in the fixed mill cavity cover 3 and the rotating mill cavity cover 8 respectively. The rotating mill 7 is fixedly connected to the rotating bearing 9, and the transmission chain 10 is driven by the motor 11 to drive the rotating bearing 9 to rotate, thereby driving the rotating mill 7 to rotate. The fixed mill 6 and the rotating mill 7 are also provided with the liquid medium temperature adjustment system, and the liquid medium temperature adjustment system is liquid medium channels separately arranged in the fixed mill 6 and the rotating mill 7 and a corresponding liquid medium circulation device. The rotating bearing 9 is separately provided with a rotating mill water inlet 12 and a rotating mill water outlet 13 which are communicated with the liquid medium channel in the rotating mill. The liquid medium channel in the fixed mill is separately communicated with a fixed mill water inlet 4 and a fixed mill water outlet 5 which are formed in a non-milling surface of the fixed mill, and the entire mill milling system is of a closed type.

The fixed mill 6 and the rotating mill 7 are fixedly connected to the hydraulic machine 2, and the milling surface spacing or pressure between the fixed mill 6 and the rotating mill 7 is adjusted by using the hydraulic machine 2.

The inductively coupled plasma powder spheroidization system includes an inductively coupled plasma generator 25, a cooling and shaping chamber 26, a collection chamber 21, a gas supply device, a high-frequency power supply 19 and a vacuum pumping device 24, and the inductively coupled plasma generator 25, the cooling and shaping chamber 26 and the collection chamber 21 are communicated with one another.

The inductively coupled plasma generator 25 includes a feeding pipe 14, a reaction gas pipe 17, a protective gas pipe 18, an induction coil 20, a molten material spray head 28 and a generator housing, the reaction gas pipe 17 is arranged in the protective gas pipe 18, one end of the feeding pipe 14 is closely connected to a discharging end of the mill milling system, the other end of the feeding pipe penetrates through the reaction gas pipe 17 and extends into the protective gas pipe 18, the induction coil 20 is arranged around an outside of the protective gas pipe 18, and the reaction gas pipe 17 does not extend into a surrounding setting surface of the induction coil 20. The molten material spray head 28 is arranged at a tip of the end, close to the induction coil 20, of the protective gas pipe 18, and a nozzle diameter of the molten material spray head 28 is 13 mm. The reaction gas pipe 17, the protective gas pipe 18, the induction coil 20 and the molten material spray head 28 are all closely fixed in the generator housing, and the inductively coupled plasma generator 25 is communicated with the cooling and shaping chamber 26 through the molten material spray head.

The feeding pipe 14 is also covered with a condensed water sleeve and the feeding pipe 14 is also provided with a temperature measuring device.

A central axis of the reaction gas pipe 17 overlaps with a central axis of the protective gas pipe 18, and one ends of the reaction gas pipe and the protective gas pipe are flush and fixed in the generator housing. The reaction gas pipe 17 is a straight pipe with a length of 60 mm and a nozzle diameter of 35 mm, and the protective gas pipe 18 is a straight pipe with a length of 350 mm and a nozzle diameter of 55 mm.

A diameter of the feeding pipe 14 is 12 mm, the other end of the feeding pipe penetrates through the reaction gas pipe and extends into the protective gas pipe, and a nozzle of the feeding pipe extending into the protective gas pipe is 40 mm away from the reaction gas pipe, so that the polymer-based powder directly enters a target area of a plasma torch through the feeding pipe, and a temperature field of the target area is 350° C.

The nozzle of the molten material spray head 28 overlaps with the central axis of the protective gas pipe 18, the molten material spray head 28 forms a convex structure toward the outside of the protective gas pipe, and the nozzle is 20 mm away from the protective gas pipe.

The cooling and shaping chamber 26 includes high-pressure gas spray heads 27 and a cooling and shaping chamber housing, there are 8 high-pressure gas spray heads 27, and a cross section of the cooling and shaping chamber housing is circular. The 8 high-pressure gas spray heads are arranged around the circular cross section of the cooling and shaping chamber housing at equal distances, and the nozzles all face a circular center of the circular cross section. The circular center is located on a central axis of the nozzle of the molten material spray head 28 and is 15 mm away from the nozzle.

The collection chamber 21 includes a condensed water inlet pipe 22, a slurry outlet 23 and a collection chamber housing, and the collection chamber housing is communicated with the cooling and shaping chamber housing.

The gas supply device includes a reaction gas inlet pipe 15 with one end communicated with the reaction gas pipe 17 and a protective gas inlet pipe 16 with one end communicated with the protective gas pipe 18, and the other ends of the reaction gas inlet pipe 15 and the protective gas inlet pipe 16 are communicated with the reaction gas pipe and the protective gas pipe respectively.

The high-frequency power supply 19 is electrically connected to the induction coil 20, and a high-frequency power supply with an output frequency of 3±0.5 MHz is used.

The vacuum pumping device 24 is communicated with an inside of the cooling and shaping chamber housing.

The generator housing, the cooling and shaping chamber housing and the collection chamber housing are connected to one another and integrally formed, a double-layer water-cooled stainless steel structure is adopted, and a cooling water inlet and outlet is formed in an outside surface.

A preparation method for preparing polymer-based spherical powder by using the preparation device includes the following steps:

(1) milling: nylon 12 particles are weighed and put into the preparation device through a feeding hopper, and process parameters for the mill milling system are set as follows: a milling pressure is 10 MPa, a rotating speed of a rotating mill is 35 r/min, and a temperature of cooling water is 4° C.;

(2) spheroidization: reaction gas and protective gas are introduced through a reaction gas inlet pipe and a protective gas inlet pipe respectively, high-pressure gas is introduced into a high-pressure gas spray head for spraying, and process parameters for an inductively coupled plasma powder spheroidization system are set as follows: a reaction gas flow rate is 1.2 m³/h, a protective gas flow rate is 1.2 m³/h, a voltage of a high-frequency power supply is 6400 V, an anode current is 7 A, a frequency is 3±0.5 MHz, a flow rate of molten materials at a nozzle is maintained at 4 V/s, a gas pressure in a cooling and shaping chamber is maintained at 0.04 MPa, and a temperature in a feeding pipe is controlled to be 50° C.;

(3) collection: condensed water is introduced through a condensed water inlet formed in a collection chamber, and a slurry product flowing out of a slurry outlet is collected;

(4) post-treatment: the collected slurry product is filtered, dried and sieved to obtain nylon 12 spherical powder.

The reaction gas is argon, and the protective gas is argon.

The high-pressure gas is argon, and an introduced gas pressure is 1.5 MPa.

The prepared nylon 12 spherical powder has a sphericity of 98% or above, an average particle size of 92.8 μm, a smooth particle surface with no wrinkles and burrs, narrow and normal particle size distribution, a half-peak width of 102 μm, a sintering window of 15.9° C., high powder flowability, and a stacking angle of 26°, and the nylon 12 spherical powder is applicable to SLS processing. Nylon 12 parts with dimensional precision of ±0.1% and density of 98% or above can be prepared by SLS processing.

Figure 2:
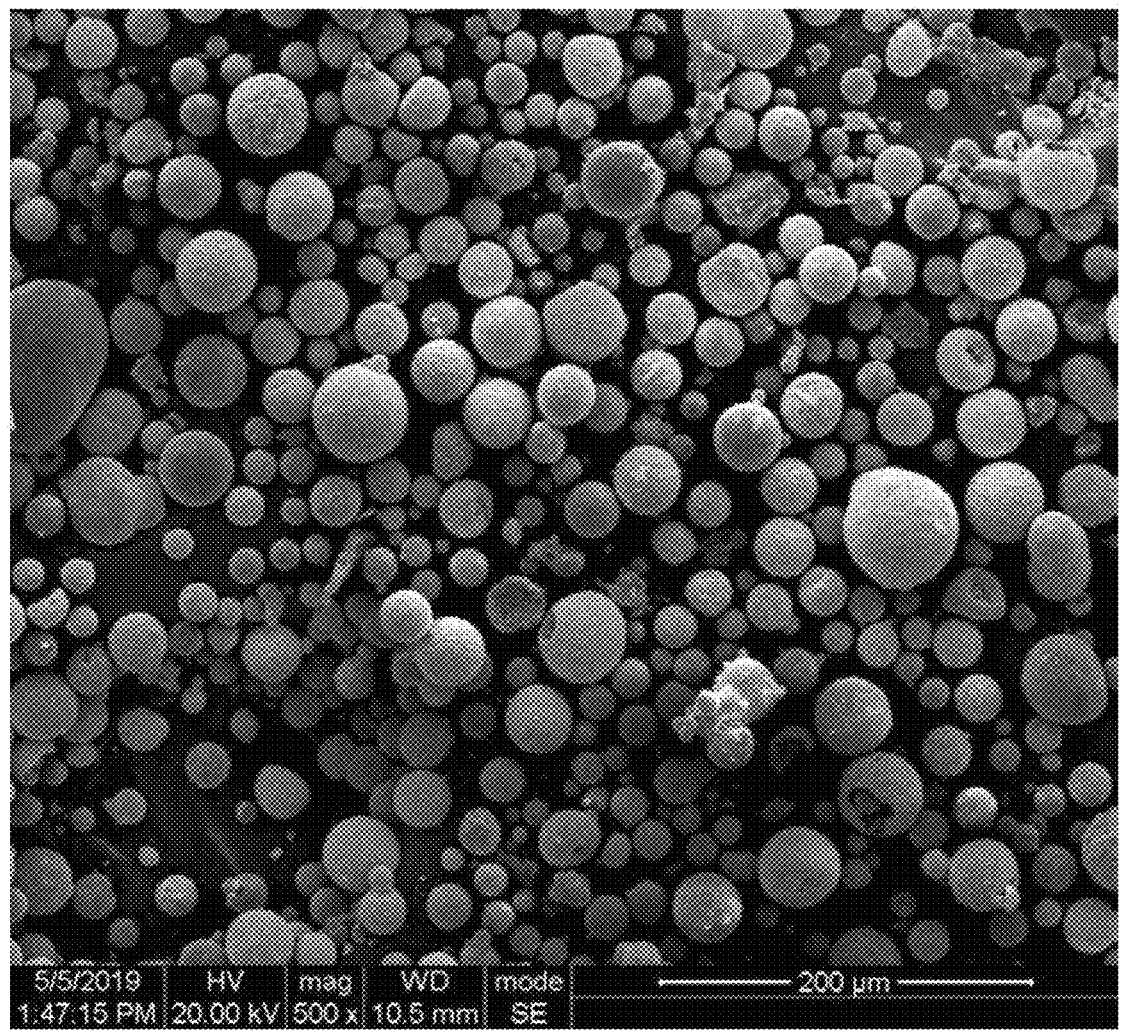
FIG. 2 is an electron micrograph of nylon 12 spherical powder prepared in Embodiment 1 of the present invention.

FIG. 2 is a scanning electron micrograph of prepared nylon 12 spherical powder. It can be seen from characterization results that the prepared nylon 12 powder is spherical in shape, smooth in surface and dense in morphology and has no tail burrs or corner angles, so that the powder is high in flowability, high in bulk density, compact in powder bed and applicable to SLS processing.

Embodiment 2

As shown in FIG. 1, a polymer-based spherical powder preparation device includes a mill milling system and an inductively coupled plasma powder spheroidization system.

The mill milling system includes a feeding hopper 1, a mill cavity cover comprising a fixed mill cavity cover 3 and a rotating mill cavity cover 8, a fixed mill 6, a rotating mill 7, a rotating bearing 9, a transmission device comprising a transmission chain 10, a motor 11 and a liquid medium temperature adjustment system. The fixed mill 6 and the rotating mill 7 are fixed in the fixed mill cavity cover 3 and the rotating mill cavity cover 8 respectively. The rotating mill 7 is fixedly connected to the rotating bearing 9, and the transmission chain 10 is driven by the motor 11 to drive the rotating bearing 9 to rotate, thereby driving the rotating mill 7 to rotate. The fixed mill 6 and the rotating mill 7 are also provided with the liquid medium temperature adjustment system, and the liquid medium temperature adjustment system is liquid medium channels separately arranged in the fixed mill 6 and the rotating mill 7 and a corresponding liquid medium circulation device. The rotating bearing 9 is separately provided with a rotating mill water inlet 12 and a rotating mill water outlet 13 which are communicated with the liquid medium channel in the rotating mill. The liquid medium channel in the fixed mill is separately communicated with a fixed mill water inlet 4 and a fixed mill water outlet 5 which are formed in a non-milling surface of the fixed mill, and the entire mill milling system is of a closed type.

The fixed mill 6 and the rotating mill 7 are fixedly connected to the hydraulic machine 2, and the milling surface spacing or pressure between the fixed mill 6 and the rotating mill 7 is adjusted by using the hydraulic machine 2.

The inductively coupled plasma powder spheroidization system includes an inductively coupled plasma generator 25, a cooling and shaping chamber 26, a collection chamber 21, a gas supply device, a high-frequency power supply 19 and a vacuum pumping device 24, and the inductively coupled plasma generator 25, the cooling and shaping chamber 26 and the collection chamber 21 are communicated with one another.

The inductively coupled plasma generator 25 includes a feeding pipe 14, a reaction gas pipe 17, a protective gas pipe 18, an induction coil 20, a molten material spray head 28 and a generator housing, the reaction gas pipe 17 is arranged in the protective gas pipe 18, one end of the feeding pipe 14 is closely connected to a discharging end of the mill milling system, the other end of the feeding pipe penetrates through the reaction gas pipe 17 and extends into the protective gas pipe 18, the induction coil 20 is arranged around the outside of the protective gas pipe 18, and the reaction gas pipe 17 does not extend into a surrounding setting surface of the induction coil 20. The molten material spray head 28 is arranged at a tip of the end, close to the induction coil 20, of the protective gas pipe 18, and a nozzle diameter of the molten material spray head 28 is 15 mm. The reaction gas pipe 17, the protective gas pipe 18, the induction coil 20 and the molten material spray head 28 are all closely fixed in the generator housing, and the inductively coupled plasma generator 25 is communicated with the cooling and shaping chamber 26 through the molten material spray head.

The feeding pipe 14 is also covered with a condensed water sleeve and the feeding pipe 14 is also provided with a temperature measuring device.

A central axis of the reaction gas pipe 17 overlaps with a central axis of the protective gas pipe 18, and one ends of the reaction gas pipe and the protective gas pipe are flush and fixed in the generator housing. The reaction gas pipe 17 is a straight pipe with a length of 80 mm and a nozzle diameter of 40 mm, and the protective gas pipe 18 is a straight pipe with a length of 400 mm and a nozzle diameter of 60 mm.

A diameter of the feeding pipe 14 is 15 mm, the other end of the feeding pipe penetrates through the reaction gas pipe and extends into the protective gas pipe, and a nozzle of the feeding pipe extending into the protective gas pipe is 50 mm away from the reaction gas pipe, so that the polymer-based powder directly enters a target area of a plasma torch through the feeding pipe, and a temperature field of the target area is 500° C.

A nozzle of the molten material spray head 28 overlaps with the central axis of the protective gas pipe 18, the molten material spray head 28 forms a convex structure toward an outside of the protective gas pipe, and the nozzle is 30 mm away from the protective gas pipe.

The cooling and shaping chamber 26 includes high-pressure gas spray heads 27 and a cooling and shaping chamber housing, there are 8 high-pressure gas spray heads 27, and a cross section of the cooling and shaping chamber housing is circular. The 8 high-pressure gas spray heads are arranged around the circular cross section of the cooling and shaping chamber housing at equal distances, and the nozzles all face a circular center of the circular cross section. The circular center is located on a central axis of the nozzle of the molten material spray head 28 and is 20 mm away from the nozzle.

The collection chamber 21 includes a condensed water inlet pipe 22, a slurry outlet 23 and a collection chamber housing, and the collection chamber housing is communicated with the cooling and shaping chamber housing.

The gas supply device includes a reaction gas inlet pipe 15 with one end communicated with the reaction gas pipe 17 and a protective gas inlet pipe 16 with one end communicated with the protective gas pipe 18, and the other ends of the reaction gas inlet pipe 15 and the protective gas inlet pipe 16 are communicated with the reaction gas pipe and the protective gas pipe respectively.

The high-frequency power supply 19 is electrically connected to the induction coil 20, and a high-frequency power supply with an output frequency of 3±0.5 MHz is used.

The vacuum pumping device 24 is communicated with an inside of the cooling and shaping chamber housing.

The generator housing, the cooling and shaping chamber housing and the collection chamber housing are connected to one another and integrally formed, a double-layer water-cooled stainless steel structure is adopted, and a cooling water inlet and outlet is formed in an outside surface.

A preparation method for preparing polymer-based spherical powder by using the preparation device includes the following steps:

(1) milling: polyether-ether-ketone particles are weighed and put into the preparation device through a feeding hopper, and process parameters for a mill milling system are set as follows: a milling pressure is 15 MPa, a rotating speed of a rotating mill is 50 r/min, and a temperature of cooling water is 10° C.;

(2) spheroidization: reaction gas and protective gas are introduced through a reaction gas inlet pipe and a protective gas inlet pipe respectively, high-pressure gas is introduced into a high-pressure gas spray head for spraying, and process parameters for an inductively coupled plasma powder spheroidization system are set as follows: a reaction gas flow rate is 1.5 m$^3$/h, a protective gas flow rate is 1.5 m$^3$/h, a voltage of a high-frequency power supply is 7000 V, an anode current is 10 A, a frequency is 3±0.5 MHz, a flow rate of molten materials at a nozzle is maintained at 5 V/s, a gas pressure in a cooling and shaping chamber is maintained at 0.08 MPa, and a temperature in a feeding pipe is controlled to be 70° C.;

(3) collection: condensed water is introduced through a condensed water inlet formed in a collection chamber, and a slurry product flowing out of a slurry outlet is collected;

(4) post-treatment: the collected slurry product is filtered, dried and sieved to obtain polyether-ether-ketone spherical powder.

The reaction gas is argon, and the protective gas is argon.

The high-pressure gas is argon, and an introduced gas pressure is 2 MPa.

The prepared polyether-ether-ketone spherical powder has a sphericity of 97% or above, an average particle size of 95.5 μm, a smooth particle surface with no wrinkles and burrs, narrow and normal particle size distribution, a half-peak width of 108 μm, a sintering window of 16.1° C., high powder flowability, and a stacking angle is 24°, and the polyether-ether-ketone spherical powder is applicable to SLS processing.

Polyether-ether-ketone parts with dimensional precision of ±0.1% and density of 98% or above can be prepared by SLS processing.

Embodiment 3

As shown in FIG. 1, a polymer-based spherical powder preparation device includes a mill milling system and an inductively coupled plasma powder spheroidization system.

The mill milling system includes a feeding hopper 1, a mill cavity cover comprising a fixed mill cavity cover 3 and a rotating mill cavity cover 8, a fixed mill 6, a rotating mill 7, a rotating bearing 9, a transmission device comprising a transmission chain 10, a motor 11 and a liquid medium temperature adjustment system. The fixed mill 6 and the rotating mill 7 are fixed in the fixed mill cavity cover 3 and the rotating mill cavity cover 8 respectively. The rotating mill 7 is fixedly connected to the rotating bearing 9, and the transmission chain 10 is driven by the motor 11 to drive the rotating bearing 9 to rotate, thereby driving the rotating mill 7 to rotate. The fixed mill 6 and the rotating mill 7 are also provided with the liquid medium temperature adjustment system, and the liquid medium temperature adjustment system is liquid medium channels separately arranged in the fixed mill 6 and the rotating mill 7 and a corresponding liquid medium circulation device. The rotating bearing 9 is separately provided with a rotating mill water inlet 12 and a rotating mill water outlet 13 which are communicated with the liquid medium channel in the rotating mill. The liquid medium channel in the fixed mill is separately communicated with a fixed mill water inlet 4 and a fixed mill water outlet 5 which are formed in a non-milling surface of the fixed mill, and the entire mill milling system is of a closed type.

The fixed mill 6 and the rotating mill 7 are fixedly connected to the hydraulic machine 2, and the milling surface spacing or pressure between the fixed mill 6 and the rotating mill 7 is adjusted by using the hydraulic machine 2.

The inductively coupled plasma powder spheroidization system includes an inductively coupled plasma generator 25, a cooling and shaping chamber 26, a collection chamber 21, a gas supply device, a high-frequency power supply 19 and a vacuum pumping device 24, and the inductively coupled plasma generator 25, the cooling and shaping chamber 26 and the collection chamber 21 are communicated with one another.

The inductively coupled plasma generator 25 includes a feeding pipe 14, a reaction gas pipe 17, a protective gas pipe 18, an induction coil 20, a molten material spray head 28 and a generator housing, the reaction gas pipe 17 is arranged in the protective gas pipe 18, one end of the feeding pipe 14 is closely connected to a discharging end of the mill milling system, the other end of the feeding pipe penetrates through the reaction gas pipe 17 and extends into the protective gas pipe 18, the induction coil 20 is arranged around an outside of the protective gas pipe 18, and the reaction gas pipe 17 does not extend into a surrounding setting surface of the induction coil 20. The molten material spray head 28 is arranged at a tip of the end, close to the induction coil 20, of the protective gas pipe 18, and a nozzle diameter of the molten material spray head 28 is 10 mm. The reaction gas pipe 17, the protective gas pipe 18, the induction coil 20 and the molten material spray head 28 are all closely fixed in the generator housing, and the inductively coupled plasma generator 25 is communicated with the cooling and shaping chamber 26 through the molten material spray head.

The feeding pipe 14 is also covered with a condensed water sleeve and the feeding pipe 14 is also provided with a temperature measuring device.

A central axis of the reaction gas pipe 17 overlaps with a central axis of the protective gas pipe 18, and one ends of the reaction gas pipe and the protective gas pipe are flush and fixed in the generator housing. The reaction gas pipe 17 is a straight pipe with a length of 50 mm and a nozzle diameter of 30 mm, and the protective gas pipe 18 is a straight pipe with a length of 300 mm and a nozzle diameter of 50 mm.

A diameter of the feeding pipe 14 is 10 mm, the other end of the feeding pipe penetrates through the reaction gas pipe and extends into the protective gas pipe, and a nozzle of the feeding pipe extending into the protective gas pipe is 20 mm away from the reaction gas pipe, so that the polymer-based powder directly enters a target area of a plasma torch through the feeding pipe, and a temperature field of the target area is 350° C.

A nozzle of the molten material spray head 28 overlaps with the central axis of the protective gas pipe 18, the molten material spray head 28 forms a convex structure toward the outside of the protective gas pipe, and the nozzle is 10 mm away from the protective gas pipe.

The cooling and shaping chamber 26 includes high-pressure gas spray heads 27 and a cooling and shaping chamber housing, there are 8 high-pressure gas spray heads 27, and a cross section of the cooling and shaping chamber housing is circular. The 8 high-pressure gas spray heads are arranged around the circular cross section of the cooling and shaping chamber housing at equal distances, and the nozzles all face a circular center of the circular cross section. The circular center is located on a central axis of the nozzle of the molten material spray head 28 and is 10 mm away from the nozzle.

The collection chamber 21 includes a condensed water inlet pipe 22, a slurry outlet 23 and a collection chamber housing, and the collection chamber housing is communicated with the cooling and shaping chamber housing.

The gas supply device includes a reaction gas inlet pipe 15 with one end communicated with the reaction gas pipe 17 and a protective gas inlet pipe 16 with one end communicated with the protective gas pipe 18, and the other ends of the reaction gas inlet pipe 15 and the protective gas inlet pipe 16 are communicated with the reaction gas pipe and the protective gas pipe respectively.

The high-frequency power supply 19 is electrically connected to the induction coil 20, and a high-frequency power supply with an output frequency of 3±0.5 MHz is used.

The vacuum pumping device 24 is communicated with an inside of the cooling and shaping chamber housing.

The generator housing, the cooling and shaping chamber housing and the collection chamber housing are connected to one another and integrally formed, a double-layer water-cooled stainless steel structure is adopted, and a cooling water inlet and outlet is formed in an outside surface.

A preparation method for preparing polymer-based spherical powder by using the preparation device includes the following steps:

(1) milling: polyurethane particles are weighed and put into the preparation device through a feeding hopper, and process parameters for a mill milling system are set as follows: a milling pressure is 10 MPa, a rotating speed of a rotating mill is 20 r/min, and a temperature of cooling water is 0° C.;

(2) spheroidization: reaction gas and protective gas are introduced through a reaction gas inlet pipe and a protective gas inlet pipe respectively, high-pressure gas is introduced into a high-pressure gas spray head for spraying, and process parameters for an inductively coupled plasma powder spheroidization system are set as follows: a reaction gas flow rate is 1 m$^3$/h, a protective gas flow rate is 1 m$^3$/h, a voltage of a high-frequency power supply is 6000 V, an anode current is 5 A, a frequency is 2.5 MHz, a flow rate of molten materials at a nozzle is maintained at 3 V/s, a gas pressure in a cooling and shaping chamber is maintained at 0.02 MPa, and a temperature in a feeding pipe is controlled to be 40° C.;

(3) collection: condensed water is introduced through a condensed water inlet formed in a collection chamber, and a slurry product flowing out of a slurry outlet is collected;

(4) post-treatment: the collected slurry product is filtered, dried and sieved to obtain polyurethane spherical powder.

The reaction gas is argon, and the protective gas is argon.

The high-pressure gas is argon, and an introduced gas pressure is 1 MPa.

The prepared polyurethane spherical powder has a sphericity of 98% or above, an average particle size of 95.7 μm, a smooth particle surface with no wrinkles and burrs, narrow and normal particle size distribution, a half-peak width of 109 μm, a sintering window of 15.7° C., high powder flowability, and a stacking angle of 23°, and the polyurethane spherical powder is applicable to SLS processing. Polyurethane parts with dimensional precision of ±0.1% and density of 98% or above can be prepared by SLS processing.

What is claimed is:

1. A polymer-based spherical powder preparation device, comprising a mill milling system and an inductively coupled plasma powder spheroidization system, wherein
the mill milling system comprises a feeding member, a mill cavity cover, a fixed mill, a rotating mill, a rotating bearing, a transmission device, a motor and a liquid medium temperature adjustment system; the fixed mill and the rotating mill are fixed in the mill cavity cover, the rotating mill is fixedly connected to the rotating bearing, and the transmission device is driven by the motor to drive the rotating bearing to rotate, thereby driving the rotating mill to rotate; the fixed mill and the rotating mill are also provided with the liquid medium temperature adjustment system, the liquid medium temperature adjustment system realizes temperature adjustment of the fixed mill and the rotating mill by introducing a liquid medium into the fixed mill and the rotating mill, and the mill milling system is of a closed type;

the inductively coupled plasma powder spheroidization system comprises an inductively coupled plasma generator, a cooling and shaping chamber, a collection chamber, a gas supply device, a high-frequency power supply and a vacuum pumping device, and the inductively coupled plasma generator, the cooling and shaping chamber and the collection chamber are communicated with one another;

the inductively coupled plasma generator comprises a feeding pipe, a reaction gas pipe, a protective gas pipe, an induction coil, a molten material spray head and a generator housing, the reaction gas pipe is arranged in the protective gas pipe, one end of the feeding pipe is closely connected to a discharging end of the mill milling system, the other end of the feeding pipe penetrates through the reaction gas pipe and extends into the protective gas pipe, the induction coil is arranged around the outside of the protective gas pipe, and the reaction gas pipe does not extend into a surrounding setting surface of the induction coil; the molten material spray head is arranged at a tip of the end, close to the induction coil, of the protective gas pipe; the reaction gas pipe, the protective gas pipe, the induction coil and the molten material spray head are all closely fixed in the generator housing, and the inductively coupled plasma generator is communicated with the cooling and shaping chamber through the molten material spray head;

the cooling and shaping chamber comprises a plurality of high-pressure gas spray heads and a cooling and shaping chamber housing, the high-pressure gas spraying heads are arranged around a cross section of the cooling and shaping chamber housing at equal distances, nozzles of the high-pressure gas spraying heads all face the same position in the cooling and shaping chamber housing, and the position is located on a central axis of a nozzle of the molten material spray head;

the collection chamber comprises a condensed water inlet pipe, a slurry outlet and a collection chamber housing, and the collection chamber housing is communicated with the cooling and shaping chamber housing;

the gas supply device comprises a reaction gas inlet pipe with one end communicated with the reaction gas pipe and a protective gas inlet pipe with one end communicated with the protective gas pipe, and the other ends of the reaction gas inlet pipe and the protective gas inlet pipe are communicated with the reaction gas pipe and the protective gas pipe respectively; and the vacuum pumping device is communicated with an inside of the cooling and shaping chamber housing.

2. The preparation device according to claim 1, wherein the mill milling system further comprises a hydraulic machine, the fixed mill and the rotating mill are fixedly connected to the hydraulic machine separately, and the milling surface spacing or pressure between the fixed mill and the rotating mill is adjusted by using the hydraulic machine.

3. The preparation device according to claim 1, wherein the liquid medium temperature adjustment system comprises liquid medium channels separately arranged in the fixed mill and the rotating mill and a corresponding liquid medium circulation device; the rotating bearing is separately provided with a liquid medium inlet and a liquid medium outlet, and the liquid medium inlet and the liquid medium outlet are communicated with the liquid medium channel in the rotating mill.

4. The preparation device according to claim 1, wherein the feeding pipe is also covered with a condensed water sleeve; and the feeding pipe is also provided with a temperature measuring device.

5. The preparation device according to claim 1, wherein a central axis of the reaction gas pipe overlaps with a central axis of the protective gas pipe, and one ends of the reaction gas pipe and the protective gas pipe are flush and fixed in the generator housing; the reaction gas pipe is a straight pipe with a length of 50-80 mm and a nozzle diameter of 30-40 mm, and the protective gas pipe is a straight pipe with a length of 300-400 mm and a nozzle diameter of 50-60 mm.

6. The preparation device according to claim 1, wherein a diameter of the feeding pipe is 10-15 mm, the other end of the feeding pipe penetrates through the reaction gas pipe and extends into the protective gas pipe, and the nozzle of the feeding pipe extending into the protective gas pipe is 20-50 mm away from the reaction gas pipe.

7. The preparation device according to claim 1, wherein the nozzle of the molten material spray head overlaps with a central axis of the protective gas pipe, the molten material spray head forms a convex structure toward an outside of the protective gas pipe, and the nozzle is 10-30 mm away from the protective gas pipe.

8. The preparation device according to claim 1, wherein there are 8 high-pressure gas spray heads, the cross section of the cooling and shaping chamber housing is circular, the 8 high-pressure gas spray heads are arranged around the circular cross section of the cooling and shaping chamber housing at equal distances, and the nozzles all face a circular center of the circular cross section.

9. A preparation method for preparing a polymer-based spherical powder by using the preparation device according to claim 1, comprising the following steps:
(1) milling: putting polymer-based particles into the preparation device through a feeding member, and setting process parameters for a mill milling system as follows: a milling pressure is 10-15 MPa, a rotating speed of the rotating mill is 20-50 r/min, and a liquid medium is cooling water with a temperature of 0-20° C.;
(2) spheroidization: introducing reaction gas and protective gas through a reaction gas inlet pipe and a protective gas inlet pipe respectively, introducing high-pressure gas into a high-pressure gas spray head for spraying, and setting process parameters for a inductively coupled plasma powder spheroidization system as follows: a reaction gas flow rate is 1-1.5 m$^3$/h, a protective gas flow rate is 1-1.5 m$^3$/h, a voltage of a high-frequency power supply is 6000-7000 V, an anode current is 5-10 A, an output frequency is 3±0.5 MHz, a flow rate of molten materials at a nozzle is maintained at 3-5 V/s, and gas pressure in a cooling and shaping chamber is maintained at 0.02-0.08 MPa;
(3) collection: introducing condensed water through a condensed water inlet pipe arranged on the collection chamber, and collecting a slurry product flowing out of a slurry outlet;
(4) post-treatment: filtering, drying and sieving the collected slurry product to obtain polymer-based spherical powder.

10. The preparation method according to claim 9, wherein in the spheroidization step, a temperature in the feeding pipe is controlled to be 40-70° C.

\* \* \* \* \*